US012574922B2

(12) United States Patent
He

(10) Patent No.: US 12,574,922 B2
(45) Date of Patent: Mar. 10, 2026

(54) INFORMATION TRANSMISSION METHOD, DEVICE AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/178,642

(22) Filed: Mar. 6, 2023

(65) Prior Publication Data

US 2023/0209541 A1     Jun. 29, 2023

Related U.S. Application Data

(63) Continuation of application No. PCT/CN2020/116792, filed on Sep. 22, 2020.

(51) Int. Cl.
*H04W 72/1268* (2023.01)
*H04W 72/21* (2023.01)
(Continued)

(52) U.S. Cl.
CPC ....... *H04W 72/1268* (2013.01); *H04W 72/21* (2023.01); *H04W 74/0833* (2013.01); *H04W 74/0836* (2024.01)

(58) Field of Classification Search
CPC ........................... H04W 72/1268; H04W 72/21
(Continued)

(56) References Cited

U.S. PATENT DOCUMENTS

2011/0305197 A1* 12/2011 Park ...................... H04W 72/04
370/328
2019/0174401 A1 6/2019 Liu et al.
(Continued)

FOREIGN PATENT DOCUMENTS

CN        107079499 A     8/2017
CN        110115096 A     8/2019
(Continued)

OTHER PUBLICATIONS

International Search Report (ISR) dated May 27, 2021 for Application No. PCT/CN2020/116792, and its English Translation provided by WIPO.
(Continued)

*Primary Examiner* — Chi Tang P Cheng
(74) *Attorney, Agent, or Firm* — Ladas & Parry, LLP

(57) ABSTRACT

The present application provides an information transmission method, a device and a storage medium, and the method includes that: a terminal device generates indication information used to indicate device information of the terminal device and sends the indication information to a network device, where the indication information is carried by a physical uplink shared channel PUSCH. The network device determines the device information of the terminal device according to the received indication information. Through the aforementioned transmission mode, the network device can know a device type or a receiving capability of a terminal, thereby improving utilization rate of a downlink spectrum.

4 Claims, 6 Drawing Sheets

(51) Int. Cl.
    *H04W 74/0833*     (2024.01)
    *H04W 74/0836*     (2024.01)
(58) Field of Classification Search
    USPC .......................................................... 370/329
    See application file for complete search history.

(56) References Cited

U.S. PATENT DOCUMENTS

| | | | | |
|---|---|---|---|---|
| 2019/0306848 | A1* | 10/2019 | Zhou | H04W 72/044 |
| 2020/0100294 | A1* | 3/2020 | Chen | H04W 80/02 |
| 2020/0252906 | A1 | 8/2020 | Chen | |
| 2020/0260500 | A1 | 8/2020 | Agiwal et al. | |
| 2020/0267772 | A1 | 8/2020 | Jung et al. | |
| 2020/0374899 | A1* | 11/2020 | Ohta | H04W 72/1268 |
| 2021/0058971 | A1* | 2/2021 | MolavianJazi | H04L 5/0044 |
| 2021/0195654 | A1* | 6/2021 | Lei | H04W 72/21 |
| 2022/0183071 | A1 | 6/2022 | Liu | |
| 2022/0264589 | A1 | 8/2022 | Sun et al. | |

FOREIGN PATENT DOCUMENTS

| | | | |
|---|---|---|---|
| CN | 106559167 | B | 9/2019 |
| CN | 111492716 | A | 8/2020 |
| CN | 113676293 | A | 11/2021 |
| EP | 3952551 | A1 | 2/2022 |
| EP | 4149132 | A1 | 3/2023 |
| WO | 2016025899 | A1 | 2/2016 |
| WO | 2019153332 | A1 | 8/2019 |
| WO | 2020032646 | A1 | 2/2020 |
| WO | 2020166899 | A1 | 8/2020 |

OTHER PUBLICATIONS

Written Opinion (WOSA) dated May 27, 2021 for Application No. PCT/CN2020/116792, and its English Translation provided by Google Translate.
InterDigital Inc., "Discussion on 2-step RACH Channel Structure"; R1-1912067, 3GPP TSG RAN WG1 #99, Reno, USA, Nov. 18-22, 2019, all pages.

Samsung, "Considerations on access barring and UE capability"; R1-2003913, 3GPP TSG RAN WG1 #101, e-Meeting, May 25-Jun. 5, 2020, all pages.
3GPP TS 38.211 V16.2.0 (Jun. 2020); 3rd Generation Partnership Project; Technical Specification Group Radio Access Network; NR; Physical channels and modulation (Release 16), all pages.
Moderator (Intel Corporation), "Summary on [102-e-NR-RedCap-05]" ; R1-2007283, 3GPP TSG RAN WG1 Meeting #102-E, e-Meeting, Aug. 17-28, 2020, all pages.
3GPP TS 38.331 V16.0.0 (Mar. 2020); 3rd Generation Partnership Project; Technical Specification Group Radio Access Network; NR; Radio Resource Control (RRC) protocol specification (Release 16), all pages.
The extended European search report of corresponding European application No. 20954361.0 dated Sep. 4, 2023.
The first Office Action of corresponding Japanese patent application No. 2023-516724 dated Jun. 18, 2024.
Ericsson, TBS limitation and indication of category for low complexity UEs, R2-144216, 3GPP TSG-RAN WG2 #87bis, Shanghai, P.R. China, Oct. 6-10, 2014.
Apple, RRC Message Transmisson in 2-step RACH, R2-1909872, 3GPP TSG-RAN WG2 Meeting #107, Prague, Czech Republic, Aug. 26-30, 2019.
The first Office Action and search report of corresponding Chinese Patent application No. 202310194126.6 dated Sep. 30, 2024.
The first Office Action of corresponding Indian patent application No. 202317028686 dated Dec. 17, 2024.
The Second Office Action of corresponding Chinese patent application No. 202310194126.6 dated Dec. 20, 2024.
The Rejection of corresponding Chinese application No. 202310194126.6 dated Mar. 29, 2025.
The first Office Action of corresponding Korean patent application No. 10-2023-7011383, dated Aug. 19, 2025.
Huawei, HiSilicon, Other aspects for reduced capability devices, R1-2004612, 3GPP TSG RAN WG1 Meeting #101-e, E-meeting, May 25-Jun. 5, 2020.
CMCC, Discussion on Procedure for 2-step RACH, R1-1906512, 3GPP TSG RAN WG1 #97, Reno, USA, May 13-17, 2019.

* cited by examiner

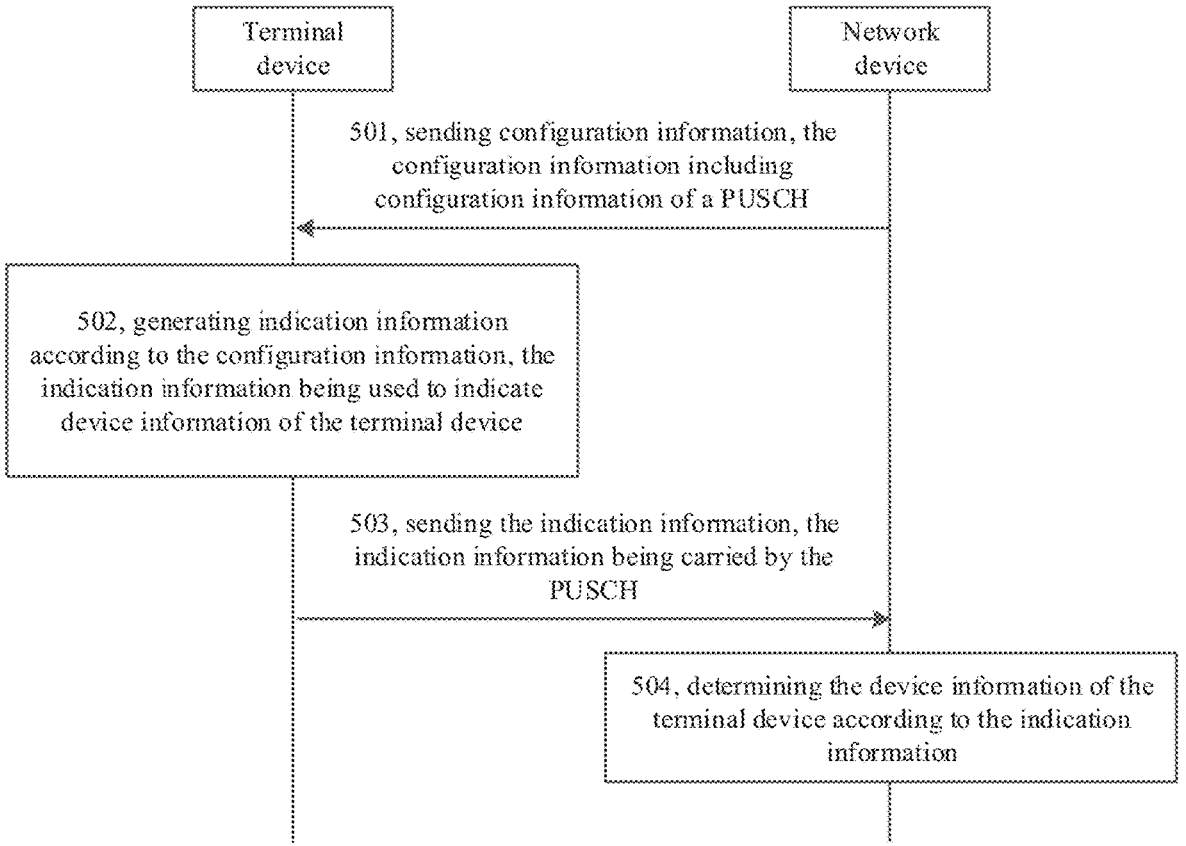

501, sending configuration information, the configuration information including configuration information of a PUSCH 502, generating indication information according to the configuration information, the indication information being used to indicate device information of the terminal device 503, sending the indication information, the indication information being carried by the PUSCH 504, determining the device information of the terminal device according to the indication information

FIG. 6

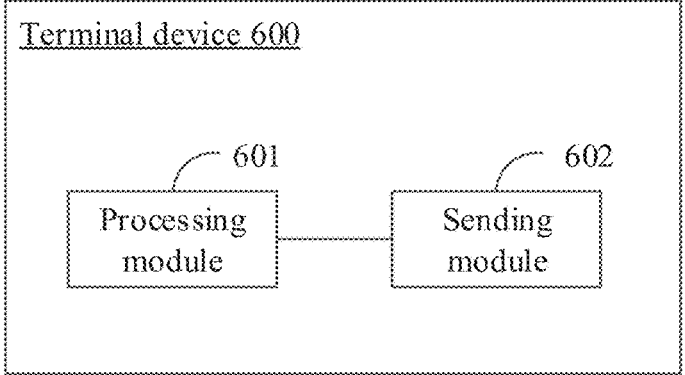

Terminal device 600

601

Processing module

602

Sending module

FIG. 7

INFORMATION TRANSMISSION METHOD, DEVICE AND STORAGE MEDIUM

CROSS-REFERENCE TO RELATED APPLICATIONS

The present application is a continuation of International Application No. PCT/CN2020/116792, filed on Sep. 22, 2020, entitled "INFORMATION TRANSMISSION METHOD, DEVICE AND STORAGE MEDIUM", the content of which is incorporated herein by reference in its entirety.

TECHNICAL FIELD

Embodiments of the present application relate to the field of communication technology, and in particular, to an information transmission method, a device and a storage medium.

BACKGROUND

For a terminal in an IOT scenario, such terminal has characteristics of reduced bandwidth, reduced processing speed, and reduced antenna number when compared with an existing new radio (NR) terminal, and this type of terminal is referred to as a reduced capability (RedCap) terminal.

In a random access procedure, a network device sends a Msg2, a Msg4 or a MsgB to a terminal through a public channel. Since the network device cannot know a type of the terminal, one solution is that the network device sets a transmission mode of a downlink channel, for example, a size of scheduled resource, a modulation and coding scheme, etc., according to a default quantity of receiving antennas of a terminal. The aforementioned solution causes downlink spectrum effectiveness to be reduced.

SUMMARY

The embodiments of the present application provide an information transmission method, a device and a storage medium, to enable a network device to know a device type or a receiving capability of a terminal, thereby improving utilization rate of a downlink spectrum.

In a first aspect, the embodiments of the present application provide an information transmission method, including that: a terminal device generates indication information, the indication information being used to indicate device information of the terminal device; and the terminal device sends the indication information to a network device, the indication information being carried by a physical uplink shared channel PUSCH.

In a second aspect, the embodiments of the present application provide an information transmission method, including that: a network device receives indication information from a terminal device, the indication information being used to indicate device information of the terminal device and the indication information being carried by a physical uplink shared channel PUSCH; and the network device determines the device information of the terminal device according to the indication information.

In a third aspect, the embodiments of the present application provide a terminal device, including: a processing module and a sending module, where the processing module is configured to generate indication information, and the indication information is used to indicate device information of the terminal device; and the sending module is configured to send the indication information to a network device, and the indication information is carried by a physical uplink shared channel PUSCH.

In a fourth aspect, the embodiments of the present application provide a network device, including: a receiving module and a processing module, where the receiving module is configured to receive indication information from a terminal device, and the indication information is used to indicate device information of the terminal device and is carried by a physical uplink shared channel PUSCH; and the processing module is configured to determine the device information of the terminal device according to the indication information.

In a fifth aspect, the embodiments of the present application provide a terminal device, including: a memory and a processor. The memory is configured to store a computer program, and the processor is configured to call and run the computer program from the memory, to cause the processor to run the computer program to execute the method in any of the first aspect.

In a sixth aspect, the embodiments of the present application provide a network device, including: a memory and a processor. The memory is configured to store a computer program, and the processor is configured to call and run the computer program from the memory, to cause the processor to run the computer program to execute the method in any of the second aspect.

In a seventh aspect, the embodiments of the present application provide a storage medium which includes a computer program, and the computer program is used to implement the method in any of the first aspect.

In an eighth aspect, the embodiments of the present application provide a storage medium which includes a computer program, and the computer program is used to implement the method in any of the second aspect.

The embodiments of the present application provide an information transmission method, a device and a storage medium, and the method includes that: a terminal device generates indication information used to indicate device information of the terminal device and sends the indication information to a network device, the indication information being carried by a physical uplink shared channel PUSCH. The network device determines the device information of the terminal device according to the received indication information. Through the aforementioned transmission mode, the network device can know a device type or a receiving capability of a terminal, thereby improving utilization rate of a downlink spectrum.

BRIEF DESCRIPTION OF DRAWINGS

FIG. 6 is a schematic interaction diagram of an information transmission method provided by an embodiment of the present application.

FIG. 7 is a schematic structural diagram of a terminal device provided by an embodiment of the present application.

DESCRIPTION OF EMBODIMENTS

In order to make a purpose, a technical solution, and an advantage of the embodiments of the present application clearer, the technical solution of the embodiments of the present application will be described clearly and completely in combination with drawings in the embodiments of the present application. Obviously, the described embodiments are part of the embodiments of the present application, not all of the embodiments. Based on the embodiments in the present application, all other embodiments obtained by persons of ordinary skills in the art without creative labor belong to protection scope of the present application.

Terms "including" and "having" and any variations thereof in the description, claims, and the aforementioned drawings of the embodiments of the present application are intended to cover non-exclusive inclusion. For example, a process, a method, a system, a product, or a device including a series of steps or units are not necessary to be limited to those steps or units clearly listed, but may include other steps or units not clearly listed or inherent to the process, the method, the product, or the device.

The technical solution in the present application will be described below in combination with the drawings.

Figure 1:
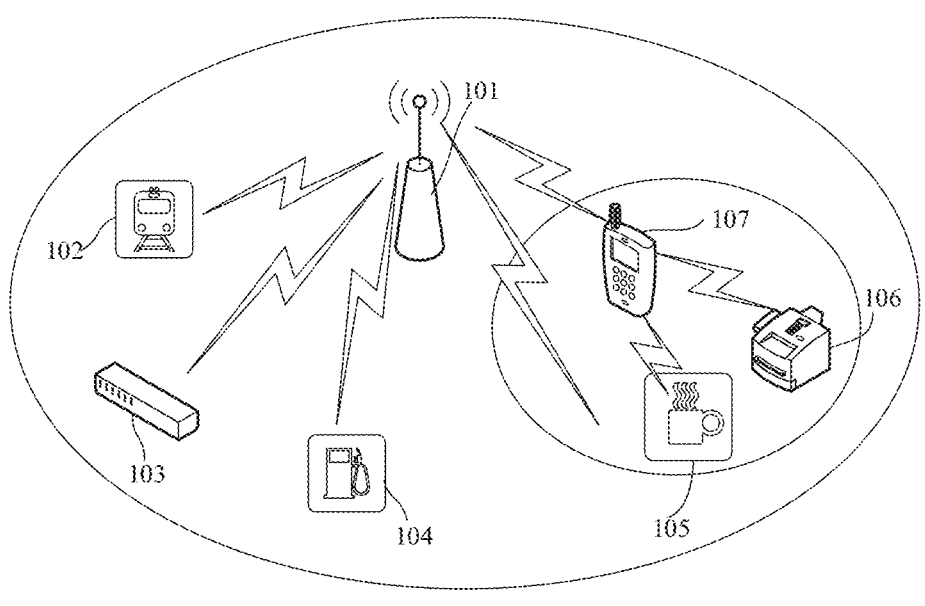
FIG. 1 is a structural schematic diagram of a communication system provided by an embodiment of the present application.

As an example, FIG. 1 is a structural diagram of a communication system provided by an embodiment of the present application. As shown in FIG. 1, the communication system 100 includes a network device 101 and a plurality of terminal devices, for example, the terminal devices 102 to 107 in FIG. 1. The network device 101 is communicatively connected with the terminal devices 102 to 107 respectively. As an example, the terminal device 105 and the terminal device 106 may also be communicatively connected with the network device 101 through the terminal device 107.

The terminal device involved in the embodiments of the present application may also be referred to as a terminal, which may be a device with a wireless transceiver function, and may be deployed on land, including an indoor or outdoor, handheld or on-board device; or may also be deployed on the water (for example, on a ship, etc.); or may also be deployed in the air (for example, on an aircraft, a balloon, and a satellite, etc.). The terminal device may be a user equipment (UE), where the UE includes a handheld device, an on-board device, a wearable device or a computing device with a wireless communication function. As an example, the UE may be a mobile phone, a tablet computer or a computer with a wireless transceiver function. The terminal devices may also be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, and a wireless terminal in a smart home, etc. In the embodiments of the present application, an apparatus for implementing a function of a terminal may be a terminal; or may also be an apparatus being capable of supporting the terminal to implement such function, for example, a chip system, and such apparatus may be installed in the terminal. In the embodiments of the present application, the chip system may be composed of a chip, or may also include a chip and other discrete devices.

The network device involved in the embodiments of the present application includes a base station (BS) and may be a device deployed in a wireless access network and capable of wireless communicating with the terminal. The base station may take many forms, for example, a macro base station, a micro base station, a relay station and an access point. As an example, the base station involved in the embodiments of the present application may be a base station in 5G or a base station in LTE, where the base station in 5G may also be referred to as a transmission reception point (TRP) or gNB. In the embodiments of the present application, an apparatus for implementing a function of a network device may be a network device; or may also be an apparatus being capable of supporting the network device to implement such function, for example, a chip system, and such apparatus may be installed in the network device.

The technical solution of the embodiments of the present application is mainly applied to a communication system based on the New Radio (NR) technology, for example, a 5th generation mobile networks (5G) communication system, or an NR-light system, etc. It may also be applied to other communication systems, as long as when there is an entity in the communication systems that needs to indicate communication with another entity, the another entity needs to interpret advance data transmission in a certain mode. For example, it may be applied to scheduling multiple data blocks between a network device and a terminal device, or two terminal devices, one of which is responsible for a function of accessing a network. Specifically, the communication system may be, for example, a global system of mobile communication (GSM) system, a code division multiple access (CDMA) system, a wideband code division multiple access (WCDMA) system, a general packet radio service (GPRS), a long term evolution (LTE) system, an advanced long term evolution LTE-A (LTE Advanced) system, an LTE frequency division duplex (FDD) system, an LTE time division duplex (TDD) system, or a universal mobile telecommunication system (UMTS), etc.

Wireless communication between communication devices may include: wireless communication between a network device and a terminal device, wireless communication between network devices, and wireless communication between terminal devices. In the embodiments of the present application, the term "wireless communication" may also be referred to as "communication" for short, and the term "communication" may also be described as "data transmission", "information transmission", or "transmission". Persons skilled in the art may apply the technical solution provided in the embodiments of the present application into wireless communication between a network device and a terminal device, for example, wireless communication between an access network device and a terminal device, and wireless communication between a core network device and a terminal device.

An NR system mainly supports enhanced mobile broadband (eMBB) services to satisfy requirements of high speed, high spectrum efficiency and large bandwidth. In a practical application, in addition to the eMBB services, there are also many other types of services, for example, data transmission services for an industrial IoT sensor, a surveillance camera, and a wearable device. Terminals supporting these services have characteristics of a large number of connections, low power consumption, and low cost. Compared with terminals supporting the eMBB services, hardware capabilities are reduced, for example, supported bandwidth, processing speed, and the quantity of antennas are reduced. Such terminals are referred to as reduced capability (RedCap) terminals. Therefore, the NR system needs to be optimized for the reduced capability terminals supporting the aforementioned other types of services, and a corresponding system is referred to as an NR-light system.

In the NR-light system, compared with a non-RedCap terminal, receiving performance of a downlink channel of a RedCap terminal is degraded due to the reduced quantity of receiving antennas. In a random access procedure, a network device sends a Msg2, a Msg4 or a MsgB to a terminal through a public channel. Usually, a transmission mode of a downlink channel, for example, a size of scheduled resource, a modulation and coding scheme, etc., is set according to a default number of a receiving antenna of the RedCap terminal (for example, one receiving antenna), which will reduce downlink spectrum efficiency.

To solve the aforementioned problem, the embodiments of the present application provide an information transmission method. The method is that in a random access procedure, a terminal device reports a device type or receiving capability of the terminal device to a network device through a variety of reporting modes, where the terminal device includes RedCap and non-RedCap terminal devices. After knowing the device type or receiving capability of the terminal, the network device transmits data or signaling using a corresponding downlink channel transmission mode, thereby improving utilization rate of a downlink spectrum.

In an embodiment of the present application, the terminal device carries indication information through a physical random access channel (PRACH), and the indication information is used to indicate the device type or the receiving capability of the terminal device. As an example, the terminal device may indicate different device types (for example, RedCap and non-RedCap) or receiving capabilities (for example, a receiving-antenna quantity is 1, and a receiving-antenna quantity is 2) through different preambles preamble, initial uplink bandwidth parts (BWP), or PRACH resources.

In an embodiment of the present application, the terminal device carries indication information through a physical uplink shared channel (PUSCH), and the indication information is used to indicate the device type or the receiving capability of the terminal device. As an example, the terminal device may indicate different device types (for example, the RedCap and the non-RedCap) or receiving capabilities (for example, the receiving-antenna quantity is 1, or the receiving-antenna quantity is 2) through different PUSCH scrambling codes, sequences of a PUSCH demodulation reference signal (DMRS), or different PUSCH configurations (including PUSCH resource configurations configuring part of configuration parameters of the PUSCH), PUSCH DMRS configurations (including PUSCH DMRS resource configurations, configuring part of configuration parameters of the PUSCH DMRS).

Before introducing the technical solution provided in the present application, a random access procedure of a current NR system is introduced first.

At present, the random access procedure in the NR system includes the following two types: 4-step random access procedure (4-Step RACH procedure) and 2-step random access procedure (2-Step RACH procedure). Delay overhead of the 4-Step RACH procedure is larger, which is not applicable to a low delay and high reliability scenario in 5G. In this regard, the 2-Step RACH procedure is introduced in NR R16. Compared with the 4-Step RACH procedure, access delay can be reduced.

Figure 2:
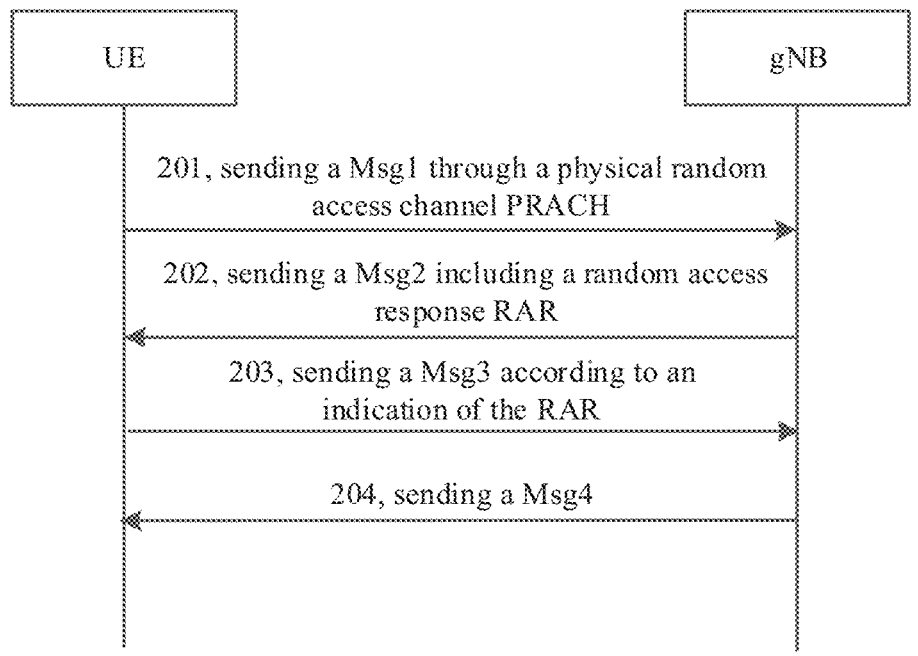
FIG. 2 is a schematic diagram of a random access procedure provided by an embodiment of the present application.

FIG. 2 is a schematic diagram of a random access procedure provided by an embodiment of the present application. As shown in FIG. 2, a random access procedure provided in the present embodiment is a 4-Step RACH procedure, mainly including the following steps.

Step 201, UE sends a Msg1 to a gNB through a physical random access channel PRACH.

The Msg1 includes a random access preamble. The gNB detects the preamble and executes step 202 in respond to a random access request of the UE.

Step 202, the gNB sends a Msg2 including a random access response (RAR) to the UE.

The RAR in the Msg2 is used to inform the UE of a PUSCH resource that may be used when sending a Msg3, allocate a radio network temporary identifier (RNTI) to the UE, and provide the UE with a timing advance time advance command, etc.

Step 203, the UE sends the Msg3 to the gNB according to an indication of the RAR.

The UE sends the Msg3 through the PUSCH resource specified in a random access response message, and the Msg3 carries temporary identifier information which is specific to the UE.

Step 204, the gNB sends a Msg4 to the UE.

The Msg4 includes a contention resolution message and allocates an uplink transmission resource to the UE. When receiving the Msg4 sent by the gNB, the UE detects whether a temporary identifier which is specific to the UE and sent by the UE in the Msg3 is included in the contention resolution message sent by the gNB. If so, it is indicated that the random access procedure of the UE is successful, otherwise, it is considered that the random access procedure has failed, and the UE needs to initiate the random access procedure again from the step 201.

Figure 3:
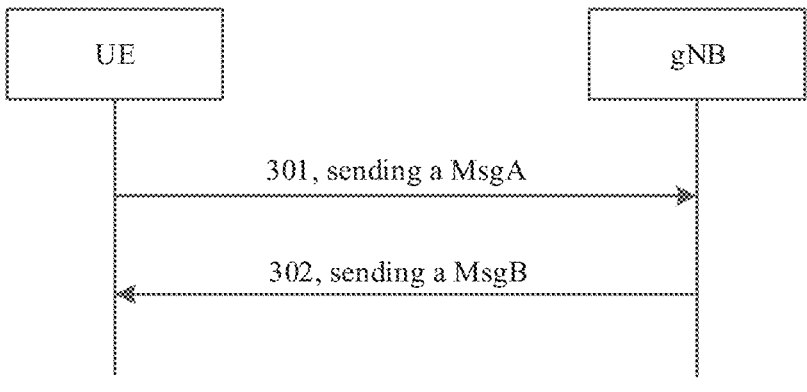
FIG. 3 is a schematic diagram of a random access procedure provided by an embodiment of the present application.

FIG. 3 is a schematic diagram of a random access procedure provided by an embodiment of the present application. As shown in FIG. 3, a random access procedure provided in the present embodiment is a 2-Step RACH procedure, mainly including the following steps.

Step 301, UE sends a MsgA to a gNB.

The MsgA includes the Msg1 and the Msg3 in the 4-Step RACH procedure. For example, the MsgA includes a preamble part, a UE identifier part and a PUSCH part. As same as the 4-Step RACH procedure, a random access occasion (RACH occasion, RO) where the preamble is located may be configured through a network. The RO may be shared with an RO of the 4-Step RACH or configured separately. A time-frequency resource where a PUSCH is located is referred to as a PUSCH occasion (PO). One PO may include a plurality of PUSCH resource units (PRU), one PRU includes a PUSCH resource and a DMRS, and the DMRS includes a DMRS port and a DMRS sequence (orthogonal frequency division multiple access) (DMRS sequence (for OFDMA)). The PO is also configured through the network, and a cycle thereof is the same as that of the RO, and the two are related.

Step 302, the gNB sends a MsgB to a terminal device.

The MsgB includes the Msg2 and the Msg4 in the 4-Step RACH procedure. For example, the MsgB includes a physical downlink shared channel (PDSCH) part and a physical downlink control channel (PDCCH) part.

Similar to step 204, the MsgB includes a contention resolution message and allocates an uplink transmission resource to the UE at the same time. When receiving the MsgB sent by the gNB, the UE detects whether a temporary identifier which is specific to the UE and sent by the UE in the MsgA is included in the contention resolution message sent by the gNB. If so, it is indicated that the random access procedure of the UE is successful, otherwise, it is considered that the random access procedure has failed, and the UE needs to initiate the random access procedure again from the step 301.

It should be noted that the technical solution provided in the embodiments of the present application may be implemented in the random access procedure shown in FIG. 2, or in the random access procedure shown in FIG. 3.

The technical solution provided in the embodiments of the present application is described in detail below through specific embodiments. It should be noted that the technical solution provided in the embodiments of the present application may include part or all of the following content. Following specific embodiments may be combined with each other, and same or similar concepts or processes may not be repeated in some embodiments.

Figure 4:
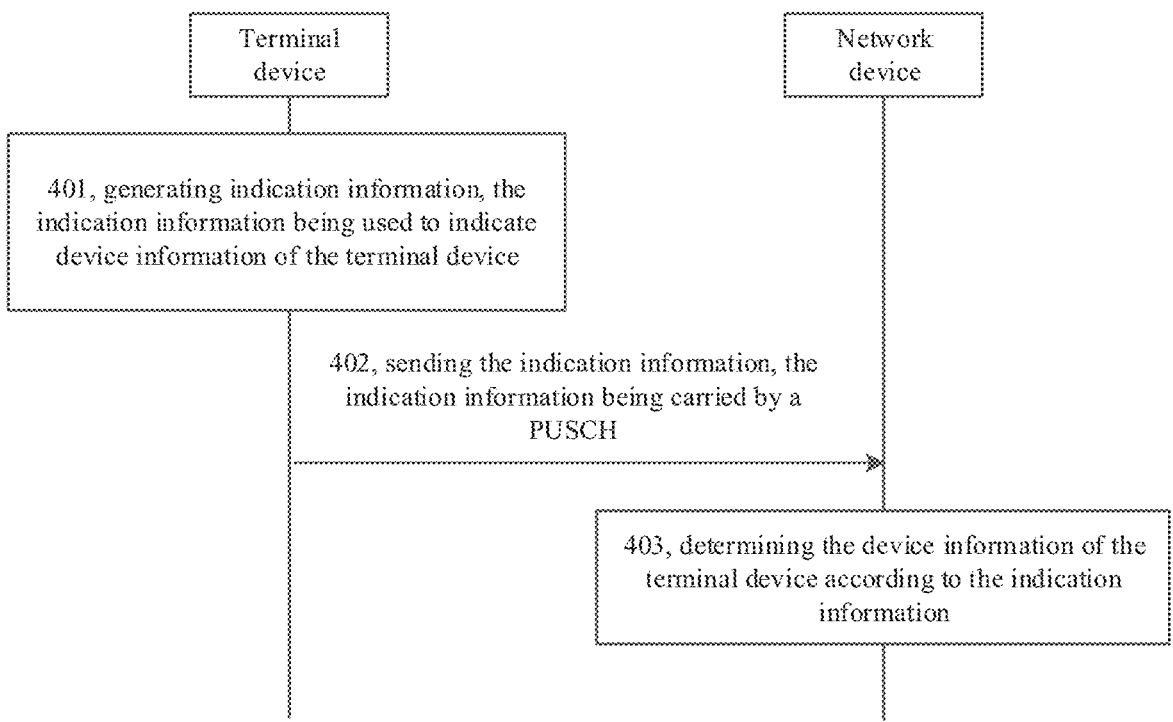
FIG. 4 is an interaction schematic diagram of an information transmission method provided by an embodiment of the present application.

FIG. 4 is a schematic interaction diagram of an information transmission method provided by an embodiment of the present application. As shown in FIG. 4, the method provided in the present embodiment includes the following steps.

Step 401, a terminal device generates indication information, the indication information being used to indicate device information of the terminal device.

The device information of the terminal device includes at least one of a device type and a receiving-antenna quantity of the terminal device. The device type (or referred to as a terminal type) includes a RedCap terminal or a non-RedCap terminal. In an implementation, the device type may also include further subdivision of the RedCap terminal, for example, RedCap terminal type 1, and RedCap terminal type 2, etc. The receiving-antenna quantity includes 1 receiving antenna, 2 receiving antennas or more than 2 receiving antennas.

Step 402, the terminal device sends the indication information to a network device, the indication information being carried by a PUSCH.

The PUSCH is a PUSCH in a Msg3 or a PUSCH in a MsgA. Specifically,

In an embodiment of the present application, in a 4-Step RACH procedure, the terminal device may carry the indication information through the PUSCH in the Msg3, and the indication information is used to indicate the device type or the receiving capability of the terminal device.

In a solution, the terminal device may carry the indication information through a scrambling code of the PUSCH in the Msg3. Terminals with different device types or different receiving capabilities correspond to different scrambling codes of the Msg3 PUSCH. As an example, for a RedCap terminal, when the terminal sends a Msg3 PUSCH to the network device, a device type or a receiving capability of the terminal may be implicitly indicated to a network by using a scrambling code of the Msg3 PUSCH which is different from that for a non-RedCap terminal.

As an example, the scrambling code of the PUSCH in the Msg3 which carries the indication information has a corresponding relationship with the device information of the terminal device, that is, terminals with different device types or different receiving capabilities correspond to different scrambling codes of the PUSCH in the Msg3. The scrambling code of the PUSCH in the Msg3 is determined according to a first initialization value. Different first initialization values generate different scrambling codes of the PUSCH in the Msg3. Therefore, as another example, the first initialization value has a corresponding relationship with the device information of the terminal device.

In a case, the first initialization value for generating the scrambling code of the PUSCH in the Msg3 may be determined according to a first parameter, and the first parameter includes at least one of a radio network temporary identifier of the terminal or a data scrambling code identifier. See Formula 1 for details.

$$c_{int} = n_{RNTI} \cdot 2^{15} + n_{ID} \qquad \text{Formula 1}$$

In the formula, $c_{int}$ represents the first initialization value for generating the scrambling code of the PUSCH in the Msg3; $n_{RNTI}$ represents the radio network temporary identifier of the terminal; $n_{ID}$ represents the data scrambling code identifier, that is, a value of a high layer parameter dataScramblingIdentityPUSCH, $n_{ID} \in (0, 1, \ldots, 1023)$. For transmission of the Msg3 during a random access procedure, if TC-RNTI (temporary C-RNTI) is assigned by a high layer, $n_{RNTI}$ is TC-RNTI; otherwise, $n_{RNTI}$ is C-RNTI (Cell RNTI).

It can be seen from Formula 1 that, with $n_{ID}$ unchanged, a different $n_{RNTI}$ corresponds to a different $c_{int}$, a different $c_{int}$ generates a different scrambling code of the PUSCH of the Msg3, and different scrambling codes correspond to different device types or receiving capabilities of the terminal. Therefore, as an example, $n_{RNTI}$ has a corresponding relationship with the device information of the terminal device.

Alternatively, with $n_{RNTI}$ unchanged, a different $n_{ID}$ corresponds to a different $c_{int}$, a different $c_{int}$ generates different a scrambling code of the PUSCH of the Msg3, and different scrambling codes correspond to different device types or receiving capabilities of the terminal. Therefore, as an example, $n_{ID}$ has a corresponding relationship with the device information of the terminal device.

Alternatively, the device type or the receiving capability of the terminal is indicated by a combination of $n_{RNTI}$ and $n_{ID}$.

In the aforementioned cases, the terminal device may carry the indication information through an original parameter (for example, $n_{RNTI}$ or $n_{ID}$) in the calculation formula of the first initialization value, to indicate the device type or the receiving capability of the terminal.

In another case, the first initialization value for generating the scrambling code of the PUSCH of the Msg3 may be determined according to a second parameter, and the second parameter is a newly added parameter. As an example, the second parameter is set as $n_{RC}$, and Formula 1 may be modified to Formula 2.

$$c_{int} = n_{RNTI} \cdot 2^{7} + n_{ID} \cdot 2^{x} + n_{RC} \qquad \text{Formula 2}$$

In the formula, x depends on a value range of $n_{RC}$. If the value range of $n_{RC}$ is $\{0, N-1\}$, then $x = \log_2(N)$, $y = x + a$, a corresponds to a value range of $n_{ID}$, $n_{ID} \in (0, 1, \ldots, 1023)$, for example, $a = 15$. A value of N depends on a quantity of indicated device types. For example, if the RedCap terminal type and the non-RedCap terminal type are indicated, then N is taken as 2, and if RedCap terminal types 1, 2, 3 and 4 are indicated, then N is taken as 4.

Different $n_{RC}$ may be used to carry different indication information, for example:

$n_{RC}=0$ represents the RedCAP terminal type 1, or that the receiving-antenna quantity is 1; and $n_{RC}=1$ represents the RedCAP terminal type 2, or that the receiving-antenna quantity is 2.

In the aforementioned cases, the terminal device adds a new parameter to the calculation formula of the first initialization value and carries the indication information through a value of the new parameter, to indicate the device type or the receiving capability of the terminal.

It can be seen from the aforementioned description that in the aforementioned solution, the indication information is carried by different scrambling codes of the PUSCH of the Msg3 without adding new indication information, which is easy to be implemented and has good backward compatibility.

In a solution, the terminal device may carry the indication information through a DMRS sequence of the PUSCH in the Msg3. Terminals with different device types or different receiving capabilities correspond to different DMRS sequences of the Msg3 PUSCH. As an example, for a RedCap terminal, when the terminal sends a DRMS of a Msg3 PUSCH to the network device, a device type or a receiving capability of the terminal may be implicitly indicated to a network by using a DMRS sequence of the Msg3 PUSCH which is different from that for a non-RedCap terminal.

As an example, the sequence of the PUSCH DMRS of the Msg3 carrying the indication information has a corresponding relationship with the device information of the terminal device, that is, terminals with different device types or the different receiving capabilities correspond to different sequences of the PUSCH DMRS of the Msg3. The sequence of the PUSCH DMRS of the Msg3 is determined according to a second initialization value. Different second initialization values generate different sequences of the PUSCH DMRS of the Msg3. Therefore, as another example, the second initialization value has a corresponding relationship with the device information of the terminal device.

In a case, the second initialization value for generating the sequence of the PUSCH DMRS of the Msg3 may be determined according to a third parameter, and the third parameter includes at least one of a symbol position, a symbol quantity, a code division multiplexing group (CDM group) or a scrambling parameter of the DMRS. See Formula 3 for details.

$$c_{int} = \left( 2^{17} \cdot \left( N_{symbol}^{slot} n_{s,f}^{\mu} + l + 1 \right)\left( 2N_{ID}^{\bar{n}_{SCID}} + 1 \right) + 2^{17}\left\lfloor \frac{\lambda}{2} \right\rfloor + 2N_{ID}^{\bar{n}_{SCID}} + \bar{n}_{SCID} \right) \bmod 2^{31}$$

Formula 3

In the formula, $N_{symbol}^{slot}$ represents a quantity of symbols included in a slot, $n_{s,f}^{\mu}$ represents a slot number in a radio frame, and l represents an orthogonal frequency division multiplexing OFDM symbol number in the slot.

$N_{ID}^{\bar{n}_{SCID}}$ represents a scrambling parameter, $N_{ID}^{0}$, $N_{ID}^{1} \in (0, 1, \ldots, 65535)$ are determined by a high layer configuration parameter. When there is no configuration, $$N_{ID}^{\bar{n}_{SCID}} = N_{ID}^{cell},$$

$N_{ID}^{cell}$ represents a cell identifier. When a parameter dmrs-Uplink-r16 is configured in the high layer and $$\bar{\lambda} = \lambda, \bar{n}_{SCID} = \begin{cases} n_{SCID}, & \lambda = 0 \text{ or } \lambda = 2 \\ 1 - n_{SCID}, & \lambda = 1 \end{cases},$$

and when $\bar{\lambda}=0$, $\bar{n}_{SCID}^{\bar{\lambda}}=n_{SCID}$. $\lambda$ is a CDM group of the DMRS, $\lambda \in (0, 1)$. $n_{SCID} \in (0, 1)$ is indicated through DCI format 0_1 or 0_2 or a high layer parameter, or is determined according to a relationship among a preamble, a PUSCH occasion and a DMRS resource during the 2-Step RACH procedure, otherwise $n_{SCID}=0$.

It can be seen from Formula 3 that, with other parameters unchanged, a different scrambling parameter corresponds to a different $c_{int}$, a different $c_{int}$ generates a different PUSCH DMRS sequence of the Msg3, and different DMRS sequences correspond to terminals with different device types or receiving capabilities. Therefore, as an example, the scrambling parameter has a corresponding relationship with the device information of the terminal device.

Alternatively, with other parameters unchanged, a different symbol position of the DMRS corresponds to a different $c_{int}$, a different $c_{int}$ generates a different PUSCH DMRS sequence of the Msg3, and different DMRS sequences correspond to terminals with different device types or receiving capabilities. Therefore, as an example, the symbol position of the DMRS has a corresponding relationship with the device information of the terminal device.

Alternatively, with other parameters unchanged, a different symbol quantity of the DMRS corresponds to a different $c_{int}$, a different $c_{int}$ generates a different PUSCH DMRS sequence of the Msg3, and different DMRS sequences correspond to terminals with different device types or receiving capabilities. Therefore, as an example, the symbol quantity of the DMRS has a corresponding relationship with the device information of the terminal device.

Alternatively, with other parameters unchanged, a different CDM group of the DMRS corresponds to a different $c_{int}$, a different $c_{int}$ generates a different PUSCH DMRS sequence of the Msg3, and different DMRS sequences correspond to terminals with different device types or receiving capabilities. Therefore, as an example, the CDM group of the DMRS has a corresponding relationship with the device information of the terminal device.

Alternatively, the device type or the receiving capability of the terminal is indicated jointly through at least two of the symbol position, the symbol quantity, the CDM group, and the scrambling parameter of the DMRS.

In the aforementioned cases, the terminal device may carry the indication information through an original parameter (for example, the symbol position, the symbol quantity, the CDM group, and the scrambling parameter of the DMRS) in the calculation formula of the second initialization value, to indicate the device type or the receiving capability of the terminal.

In another case, the second initialization value for generating the sequence of the PUSCH DMRS of the Msg3 may be determined according to a fourth parameter, and the fourth parameter is a newly added parameter. As an example, the fourth parameter is set as $n_{RC}$, and Formula 3 may be modified to Formula 4.

$$c_{int} = \left(2^{17} \cdot \left(N_{symbol}^{slot} n_{s,f}^{\mu} + l + 1\right)\left(2N_{ID}^{\tilde{n}_{SCID}} + 1\right) + \right.$$

$$\left. 2^{17}\left\lfloor\frac{\lambda}{2}\right\rfloor + 2N_{ID}^{\tilde{n}_{SCID}} + \tilde{n}_{SCID} + n_{RC}\right)\mathrm{mod}2^{31} \quad \text{Formula 4}$$

Different $n_{RC}$ may be used to carry different indication information, for example:

$n_{RC}$=0 represents the RedCAP terminal type 1, or that the receiving-antenna quantity is 1; and $n_{RC}$=1 represents the RedCAP terminal type 2, or that the receiving-antenna quantity is 2.

In the aforementioned cases, the terminal device adds a new parameter to the calculation formula of the second initialization value and carries the indication information through a value of the new parameter to indicate the device type or the receiving capability of the terminal.

It can be seen from the aforementioned description that in the aforementioned solution, the indication information is carried by different PUSCH DMRS sequences of the Msg3 without adding new indication information, which is easy to be implemented and has good backward compatibility.

In an embodiment of the present application, in a 2-Step RACH procedure, the terminal device may carry the indication information through the PUSCH in a MsgA, and the indication information is used to indicate the device type or the receiving capability of the terminal device.

In a solution, the terminal device may carry the indication information through a scrambling code of the PUSCH in the MsgA. Terminals with different device types or different receiving capabilities correspond to different scrambling codes of the MsgA PUSCH. As an example, for a RedCap terminal, when the terminal sends a MsgA PUSCH to the network device, a device type or a receiving capability of the terminal may be implicitly indicated to a network by using a scrambling code of the MsgA PUSCH which is different from that for a non-RedCap terminal.

As an example, the scrambling code of the PUSCH of the MsgA which carries the indication information has a corresponding relationship with the device information of the terminal device, that is, terminals with different device types or different receiving capabilities correspond to different scrambling codes of the PUSCH of the MsgA. The scrambling code of the PUSCH of the MsgA is determined according to a first initialization value. Different first initialization values generate different scrambling codes of the PUSCH of the MsgA. Therefore, as another example, the first initialization value has a corresponding relationship with the device information of the terminal device.

In a case, the first initialization value for generating the scrambling code of the PUSCH of the MsgA may be determined according to a first parameter including a radio network temporary identifier of the terminal, a data scrambling code identifier, and a random access preamble index. See Formula 5 for details.

$$c_{int} = n_{RNTI} \cdot 2^{16} + n_{RAPID} \cdot 2^{10} + n_{ID} \quad \text{Formula 5}$$

In the formula, $c_{int}$ represents the first initialization value for generating the scrambling code of the PUSCH of the MsgA; $n_{RNTI}$ represents the radio network temporary identifier of the terminal; $n_{ID}$ represents the data scrambling code identifier, that is, a value of a high layer parameter msgA-dataScramblingIdentity, $n_{ID} \in (0, 1, \ldots, 1023)$, otherwise, $n_{ID}=N_{ID}^{cell}$, and $N_{ID}^{cell}$ represents a cell ID.

It can be seen from Formula 5 that with $n_{RAPID}$ and $n_{ID}$ unchanged, a different $n_{RNTI}$ corresponds to a different $c_{int}$, a different $c_{int}$ corresponds to a different scrambling code of the PUSCH of the MsgA, and different scrambling codes correspond to different device types or receiving capabilities of the terminal. Therefore, as an example, $n_{RNTI}$ has a corresponding relationship with the device information of the terminal device.

Alternatively, with $n_{RAPID}$ and $n_{RNTI}$ unchanged, a different $n_{ID}$ corresponds to a different $c_{int}$, a different $c_{int}$ generates a different scrambling code of the PUSCH of the MsgA, and different scrambling codes correspond to different device types or receiving capabilities of the terminal. Therefore, as an example, $n_{ID}$ has a corresponding relationship with the device information of the terminal device.

Alternatively, with $n_{ID}$ and $n_{RNTI}$ unchanged, a different $n_{RAPID}$ corresponds to a different $c_{int}$, a different $c_{int}$ generates a different scrambling code of the PUSCH of the MsgA, and different scrambling codes correspond to different device types or receiving capabilities of the terminal. Therefore, as an example, $n_{RAPID}$ has a corresponding relationship with the device information of the terminal device.

Alternatively, the device type or the receiving capability of the terminal is indicated jointly through at least two of $n_{RNTI}$, $n_{ID}$ or $n_{RAPID}$.

In the aforementioned cases, the terminal device may carry the indication information through an original parameter (for example, $n_{RNTI}$, $n_{ID}$ or $n_{RAPID}$) in the calculation formula of the first initialization value, to indicate the device type or the receiving capability of the terminal.

In another case, the first initialization value for generating the scrambling code of the PUSCH of the MsgA may also be determined according to a second parameter, and the second parameter $n_{RC}$ is a newly added parameter. As an example, Formula 5 may be modified to Formula 6.

$$c_{int}=n_{RNTI} \cdot 2^{16}+n_{RAPID} \cdot 2^{10+x}+n_{ID} \cdot 2^{x}+n_{RC} \quad \text{Formula 6}$$

In the formula, x depends on a value range of $n_{RC}$. If the value range of $n_{RC}$ is $\{0, N-1\}$, then $x=\log_2(N)$. Different $n_{RC}$ may be used to carry different indication information, for example:

$n_{RC}$=0 represents the RedCAP terminal type 1, or that the receiving-antenna quantity is 1; and $n_{RC}$=1 represents the RedCAP terminal type 2, or that the receiving-antenna quantity is 2.

In the aforementioned cases, the terminal device adds a new parameter to the calculation formula of the first initialization value and carries the indication information through a new parameter to indicate the device type or the receiving capability of the terminal.

It can be seen from the aforementioned description that in the aforementioned solution, the indication information is carried by different scrambling codes of the PUSCH of the MsgA without adding new indication information, which is easy to be implemented and has good backward compatibility.

In a solution, the terminal device may carry the indication information through a DMRS sequence of the PUSCH in the MsgA. Terminals with different device types or different receiving capabilities correspond to different DMRS sequences of the MsgA PUSCH. As an example, for a RedCap terminal, when the terminal sends a DRMS of a MsgA PUSCH to the network device, a device type or a receiving capability of the terminal may be implicitly indicated to a network by using a DMRS sequence of the MsgA PUSCH which is different from that for a non-RedCap terminal.

As an example, the sequence of the PUSCH DMRS of the MsgA carrying the indication information has a corresponding relationship with the device information of the terminal device, that is, terminals with different device types or different receiving capabilities correspond to different sequences of the PUSCH DMRS of the MsgA. Similar to the sequence of the DMRS of the Msg3 PUSCH, the sequence of the DMRS of the MsgA PUSCH is determined according to the second initialization value. For the calculation formula of the second initialization value, please refer to Formula 3 or Formula 4 in the aforementioned embodiments, which will not be repeated here. The terminal device may carry the indication information through the original parameter or the newly added parameter in the calculation formulas of the second initialization value to indicate the device type or the receiving capability of the terminal.

It can be seen from the aforementioned description that in the aforementioned solution, the indication information is carried by different PUSCH DMRS sequences of the MsgA without adding new indication information, which is easy to be implemented and has good backward compatibility.

In an embodiment of the present application, in the 4-Step RACH procedure or the 2-Step RACH procedure, information carried by the PUSCH includes the indication information, and the indication information is used to indicate the device type or the receiving capability of the terminal device. A difference between the indication information in the present embodiment and that in the aforementioned embodiments is that the indication information explicitly indicates the device type or the receiving capability to a network terminal.

Figure 5:
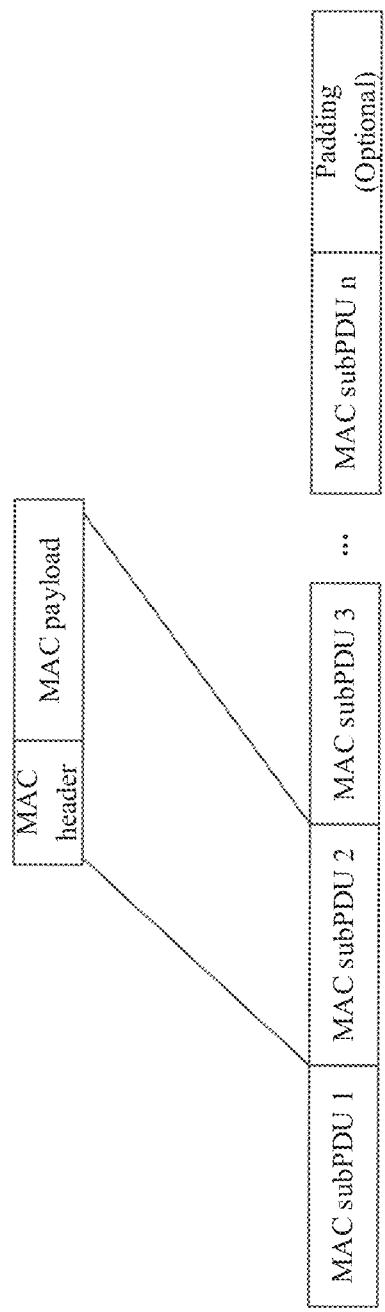
FIG. 5 is a schematic position diagram of indication information provided by an embodiment of the present application.

In the prior art, a PUSCH in a Msg3 or a MsgA may carry an identifier of UE used for conflict resolution and high layer information about the reason for connection establishment. In the aforementioned embodiments, the PUSCH in the Msg3 or the MsgA may further carry the indication information. Specifically, the indication information may be carried in a MAC PDU (protocol data unit), for example, in a payload of the MAC PDU, or in a MAC header. FIG. 5 is a schematic position diagram of indication information provided by an embodiment of the present application. As shown in FIG. 5, the indication information may be carried in an available field of a MAC header and/or a MAC payload in any MAC subPDU.

Step 403, the network device determines the device information of the terminal device according to the indication information.

It can be seen from step 402 that the terminal device may send the indication information to the network device in an explicit mode or an implicit mode. If the terminal device sends a PUSCH of a Msg3/MsgA to the network device in an explicit mode, the network device determines the device information of the terminal device according to the information carried by the PUSCH of the Msg3/MsgA. If the terminal device sends the PUSCH of the Msg3/MsgA to the network device in an implicit mode, the network device decodes the PUSCH of the Msg3/MsgA to determine a scrambling code used by the PUSCH of the Msg3/MsgA, or detects a PUSCH DMRS of the Msg3/MsgA to determine a sequence used by the PUSCH DMRS of the Msg3/MsgA, to obtain the indication information, thereby determining the device information of the terminal device.

In the information transmission method provided in the present embodiment, the terminal device generates the indication information used to indicate the device information of the terminal device and sends the indication information to the network device, where the indication information is carried by the physical uplink shared channel PUSCH. The network device determines the device information of the terminal device according to the received indication information. Through the aforementioned transmission mode, the network device can know a device type or a receiving capability of a terminal, thereby improving utilization rate of a downlink spectrum.

On the basis of the aforementioned embodiments, a following embodiment provides a specific information transmission method, which includes network configuration information for a PUSCH, for example, configuring a PUSCH resource or configuring part of PUSCH parameters, configuring a PUSCH DMRS resource or configuring part of PUSCH DMRS parameters. A technical solution provided in the present embodiment is described in detail below with reference to FIG. 6.

FIG. 6 is a schematic interaction diagram of an information transmission method provided by an embodiment of the present application. As shown in FIG. 6, the method provided in the present embodiment includes the following steps.

Step 501, a network device sends configuration information to a terminal device, the configuration information including configuration information of a PUSCH.

Step 502, the terminal device generates indication information according to the configuration information, the indication information being used to indicate device information of the terminal device.

Step 503, the terminal device sends the indication information to the network device, the indication information being carried by the PUSCH.

Step 504, the network device determines the device information of the terminal device according to the indication information.

In an embodiment of the present application, the configuration information of the PUSCH includes configuration information of a resource of the PUSCH. The configuration information of the resource of the PUSCH includes a corresponding relationship between the resource of the PUSCH and the device information of the terminal device.

Specifically, the terminal device determines the resource of the PUSCH corresponding to a device type or a receiving capability of the terminal device according to the configuration information of the resource of the PUSCH, and sends a Msg3 or a MsgA on the resource of the PUSCH. The network device determines the resource of the PUSCH of the Msg3 or the MsgA according to the received Msg3 or MsgA, thereby determining the device type or the receiving capability of the terminal device.

In an embodiment of the present application, the configuration information of the PUSCH includes configuration information of a scrambling code of the PUSCH. The configuration information of the scrambling code of the PUSCH includes: a corresponding relationship between a first parameter and the device information of the terminal device, or a corresponding relationship between a second parameter and the device information of the terminal device. The first parameter or the second parameter is used to determine a first initialization value for generating the scrambling code of the PUSCH. The first parameter is an original parameter in a calculation formula of the first initialization value, and the second parameter is a newly added parameter in the calculation formula of the first initialization value. See the aforementioned embodiments for specific parameters, which will not be extended here.

Specifically, the terminal device first determines the first parameter or the second parameter to be used according to the configuration information of the scrambling code of the PUSCH, then determines the first initialization value according to the first parameter or the second parameter, and then generates the scrambling code of the PUSCH to be used according to the first initialization value, and sends the Msg3 or the MsgA on a resource of the PUSCH. Different PUSCH scrambling codes correspond to different device types or receiving capabilities. The network device decodes the received Msg3 or MsgA, determines the scrambling code used by the PUSCH, and obtains the indication information, thereby determining the device type or the receiving capability of the terminal device.

In an embodiment of the present application, configuration information of a resource of a DMRS of the PUSCH. The configuration information of the resource of the DMRS of the PUSCH includes a corresponding relationship between the resource of the DMRS of the PUSCH and the device information of the terminal.

Specifically, the terminal device determines the resource of the PUSCH DMRS corresponding to the device type or the receiving capability of the terminal device according to the configuration information of the resource of the PUSCH DMRS, and sends the PUSCH DMRS of the Msg3 or the MsgA on the resource of the PUSCH DMRS. The network device determines the resource of the PUSCH DMRS according to the received PUSCH DMRS, thereby determining the device type or the receiving capability of the terminal device.

In an embodiment of the present application, configuration information of a sequence of a DMRS of the PUSCH. The configuration information of the sequence of the DMRS of the PUSCH includes a corresponding relationship between a third parameter and the device information of the terminal device, or a corresponding relationship between a fourth parameter and the device information of the terminal device. The third parameter or the fourth parameter is used to determine a second initialization value for generating the sequence of the DMRS of the PUSCH. The third parameter is an original parameter in a calculation formula of the second initialization value, and the fourth parameter is a newly added parameter in the calculation formula of the second initialization value. See the aforementioned embodiments for specific parameters, which will not be extended here.

Specifically, the terminal device first determines the third parameter or the fourth parameter to be used according to the configuration information of the sequence of the DMRS of the PUSCH, then determines the second initialization value according to the third parameter or the fourth parameter, and then generates the PUSCH DMRS sequence to be used according to the second initialization value, and sends the PUSCH DMRS. Different PUSCH DMRS sequences correspond to different device types or receiving capabilities. The network device detects the received PUSCH DMRS, determines the sequence used by the PUSCH DMRS, and obtains the indication information, thereby determining the device type or the receiving capability of the terminal device.

In an embodiment of the present application, the configuration information of the PUSCH includes a corresponding relationship between the scrambling code of the PUSCH and the device information of the terminal device. Specifically, the terminal device determines the scrambling code of the PUSCH to be used according to the configuration information of the PUSCH, and sends a Msg3 or a MsgA on a resource of the PUSCH. Different scrambling codes of the PUSCH correspond to different device types or receiving capabilities. The network device decodes the received Msg3 or MsgA, determines the scrambling code used by the PUSCH, and obtains the indication information, thereby determining the device type or the receiving capability of the terminal device.

In an embodiment of the present application, the configuration information of the PUSCH includes a corresponding relationship between the sequence of the DMRS of the PUSCH and the terminal device. Specifically, the terminal device determines the sequence of the DMRS of the PUSCH to be used according to the configuration information of the PUSCH, and sends a PUSCH DMRS. Different PUSCH DMRS sequences correspond to different device types or receiving capabilities. The network device detects the received PUSCH DMRS, determines the sequence used by the PUSCH DMRS, and obtains the indication information, thereby determining the device type or the receiving capability of the terminal device.

In an embodiment of the present application, the configuration information of the PUSCH includes a corresponding relationship between, the scrambling code of the PUSCH and the sequence of the DMRS of the PUSCH, and the device information of the terminal device. Joint indication is performed through the scrambling code of the PUSCH and the sequence of the DMRS of the PUSCH in the present embodiment.

As an example, a joint indication mode of the scrambling code of the PUSCH and the sequence of the DMRS of the PUSCH is as follows:

PUSCH scrambling code 0, DMRS sequence 0: RedCap terminal type 1;

PUSCH scrambling code 0, DMRS sequence 1: RedCap terminal type 2;

PUSCH scrambling code 1, DMRS sequence 0: RedCap terminal type 3;

PUSCH scrambling code 1, DMRS sequence 1: RedCap terminal type 4.

It can be seen from the aforementioned example that a plurality of types of RedCap terminals can be indicated by the joint indication of the scrambling code of the PUSCH and the sequence of the DMRS of the PUSCH, receiving performance of the plurality of types of RedCap terminals being different (for example, different receiving antennas). The network device may not only know that the terminal device is a low capability terminal, but also may know a receiving capability of the low capability terminal, thereby using a corresponding transmission mode of the downlink channel.

In an embodiment of the present application, the configuration information of the PUSCH includes the configuration information of the resource of the PUSCH and the configuration information of the resource of the DMRS of the PUSCH. In the present embodiment, by configuring the resource of the PUSCH and the resource of the DMRS of the PUSCH at the same time, the indication information is carried based on a difference in the configuration of these two resources, and the terminal device can send data on the two resources at the same time, so that the network device can know the device type or the receiving capability of the terminal device according to the difference of resources on which the data is sent.

In the information transmission method provided in the present embodiment, the network device sends configuration information including configuration information of a PUSCH to the terminal device in advance, the terminal device generates the indication information used to indicate the device information of the terminal device according to the configuration information, the terminal device sends the indication information to the network device through the PUSCH, and the network device determines the device information of the terminal device according to the indication information. The configuration information of the PUSCH includes the configuration information of the resource of the PUSCH, the configuration information of the resource of the DMRS of the PUSCH, the configuration information of the scrambling code of the PUSCH, and the configuration information of the sequence of the DMRS of the PUSCH. Through the aforementioned transmission mode, the network device can know a device type or a receiving capability of a terminal, thereby improving utilization rate of a downlink spectrum.

FIG. 7 is a schematic structural diagram of a terminal device provided by an embodiment of the present application. As shown in FIG. 7, a terminal device 600 in the present embodiment includes a processing module 601 and a sending module 602.

The processing module 601 is configured to generate indication information, the indication information being used to indicate device information of the terminal device.

The sending module 602 is configured to send the indication information to a network device, the indication information being carried by a physical uplink shared channel PUSCH.

In an embodiment of the present application, the device information of the terminal device includes at least one of a device type or a receiving-antenna quantity of the terminal device.

In an embodiment of the present application, the PUSCH is a PUSCH in a Msg3.

In an embodiment of the present application, the PUSCH is a PUSCH in a MsgA.

In an embodiment of the present application, a scrambling code of the PUSCH carrying the indication information has a corresponding relationship with the device information of the terminal device.

In an embodiment of the present application, the scrambling code of the PUSCH carrying the indication information is determined according to a first initialization value, and the first initialization value has a corresponding relationship with the device information of the terminal device.

In an embodiment of the present application, the first initialization value is determined according to a first parameter, the first parameter includes at least one of a radio network temporary identifier, a data scrambling identifier or a random access preamble index, and the first parameter has a corresponding relationship with the device information of the terminal device.

In an embodiment of the present application, the first initialization value is determined according to a second parameter, and the second parameter has a corresponding relationship with the device information of the terminal device.

In an embodiment of the present application, a sequence of a demodulation reference signal DMRS of the PUSCH carrying the indication information has a corresponding relationship with the device information of the terminal device.

In an embodiment of the present application, the sequence of the DMRS of the PUSCH is determined according to a second initialization value, and the second initialization value has a corresponding relationship with the device information of the terminal device.

In an embodiment of the present application, the second initialization value is determined according to a third parameter, the third parameter includes at least one of a symbol position, a symbol quantity, a CDM group or a scrambling parameter of the DMRS, and the third parameter has a corresponding relationship with the device information of the terminal device.

In an embodiment of the present application, the second initialization value is determined according to a fourth parameter, and the fourth parameter has a corresponding relationship with the device information of the terminal device.

Figure 8:
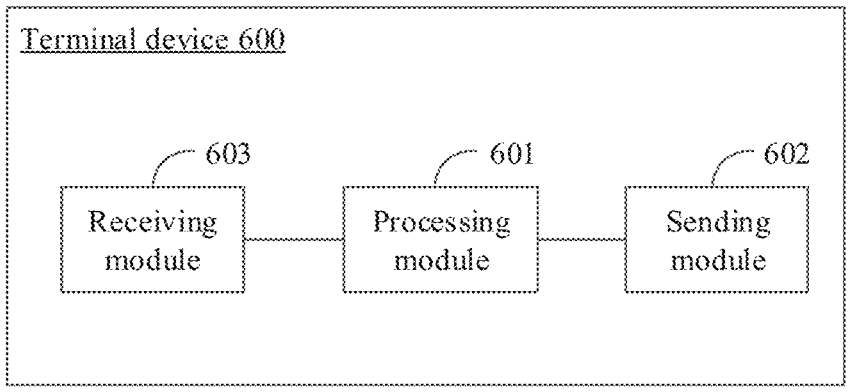
FIG. 8 is a schematic structural diagram of a terminal device provided by an embodiment of the present application.

FIG. 8 is a schematic structural diagram of a terminal device provided by an embodiment of the present application. On the basis of the terminal device shown in FIG. 7, as shown in FIG. 8, the terminal device 600 of the present embodiment further includes a receiving module 603.

The receiving module 603 is configured to receive configuration information from the network device, the configuration information including configuration information of the PUSCH;

The processing module 601 is specifically configured to generate the indication information according to the configuration information.

In an embodiment of the present application, the configuration information of the PUSCH includes configuration information of a resource of the PUSCH, and the configuration information of the resource of the PUSCH includes a corresponding relationship between the resource of the PUSCH and the device information of the terminal device.

In an embodiment of the present application, the configuration information of the PUSCH includes configuration information of a scrambling code of the PUSCH; the configuration information of the scrambling code of the PUSCH includes: the corresponding relationship between the first parameter and the device information of the terminal device, or the corresponding relationship between the second parameter and the device information of the terminal device; where the first parameter or the second parameter are both used to determine the first initialization value for generating the scrambling code of the PUSCH.

In an embodiment of the present application, the configuration information of the PUSCH includes configuration information of a resource of a DMRS of the PUSCH; the configuration information of the resource of the DMRS of the PUSCH includes a corresponding relationship between the resource of the DMRS of the PUSCH and the device information of the terminal device.

In an embodiment of the present application, the configuration information of the PUSCH includes configuration information of a sequence of the DMRS of the PUSCH; the configuration information of the sequence of the DMRS of the PUSCH includes: the corresponding relationship between the third parameter and the device information of the terminal device, or the corresponding relationship between the fourth parameter and the device information of the terminal device; where the third parameter or the fourth parameter are both used to determine the second initialization value for generating the sequence of the DMRS of the PUSCH.

In an embodiment of the present application, the configuration information of the PUSCH includes a corresponding relationship between, at least one of: the scrambling code of the PUSCH and the sequence of the DMRS of the PUSCH, and the device information of the terminal device.

In an embodiment of the present application, the configuration information of the PUSCH includes the configuration information of the resource of the PUSCH and the configuration information of the resource of the DMRS of the PUSCH.

The terminal device provided in the present embodiment of the present application is configured to implement the technical solution implemented by the terminal device in the aforementioned method embodiments shown in FIG. 4 or FIG. 6, and implementation principles and technical effects thereof are similar, which will not be repeated here.

Figure 9:
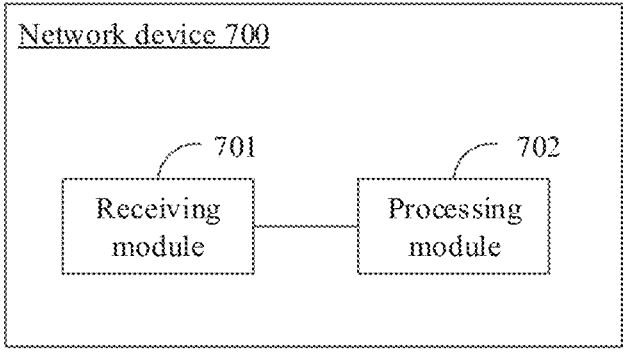
FIG. 9 is a schematic structural diagram of a network device provided by an embodiment of the present application.

FIG. 9 is a schematic structural diagram of a network device provided by an embodiment of the present application. As shown in FIG. 9, a network device 700 of the present embodiment includes a receiving module 701 and a processing module 702.

The receiving module 701 is configured to receive indication information from a terminal device, the indication information being used to indicate device information of the terminal device, and the indication information being carried by a physical uplink shared channel PUSCH.

The processing module 702 is configured to determine the device information of the terminal device according to the indication information.

In an embodiment of the present application, the device information of the terminal device includes at least one of a device type and a receiving-antenna quantity of the terminal device.

In an embodiment of the present application, the PUSCH is a PUSCH in a Msg3.

In an embodiment of the present application, the PUSCH is a PUSCH in a MsgA.

In an embodiment of the present application, a scrambling code of the PUSCH carrying the indication information has a corresponding relationship with the device information of the terminal device.

In an embodiment of the present application, the scrambling code of the PUSCH carrying the indication information is determined according to a first initialization value, and the first initialization value has a corresponding relationship with the device information of the terminal device.

In an embodiment of the present application, the first initialization value is determined according to a first parameter, the first parameter includes at least one of a radio network temporary identifier, a data scrambling identifier or a random access preamble index, and the first parameter has a corresponding relationship with the device information of the terminal device.

In an embodiment of the present application, the first initialization value is determined according to a second parameter, and the second parameter has a corresponding relationship with the device information of the terminal device.

In an embodiment of the present application, a sequence of a demodulation reference signal DMRS of the PUSCH carrying the indication information has a corresponding relationship with the device information of the terminal device.

In an embodiment of the present application, the sequence of the DMRS of the PUSCH is determined according to a second initialization value, and the second initialization value has a corresponding relationship with the device information of the terminal device.

In an embodiment of the present application, the second initialization value is determined according to a third parameter, the third parameter includes at least one of a symbol position, a symbol quantity, a CDM group or a scrambling parameter, of the DMRS, and the third parameter has a corresponding relationship with the device information of the terminal device.

In an embodiment of the present application, the second initialization value is determined according to a fourth parameter, and the fourth parameter has a corresponding relationship with the device information of the terminal device.

Figure 10:
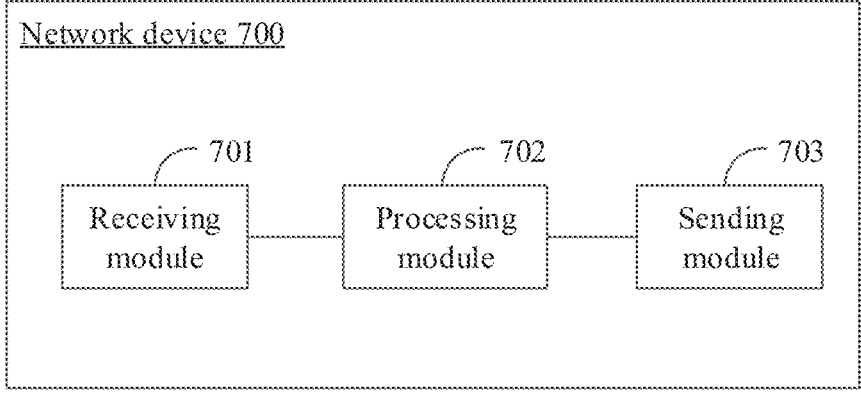
FIG. 10 is a schematic structural diagram of a network device provided by an embodiment of the present application.

FIG. 10 is a schematic structural diagram of a network device provided by an embodiment of the present application. On the basis of the network device shown in FIG. 9, as shown in FIG. 10, the network device 700 of the present embodiment further includes a sending module 703.

The sending module 703 is configured to send configuration information to the terminal device, the configuration information including configuration information of the PUSCH; where the indication information is generated by the terminal device according to the configuration information.

In an embodiment of the present application, the configuration information of the PUSCH includes configuration information of a resource of the PUSCH, and the configuration information of the resource of the PUSCH includes a corresponding relationship between the resource of the PUSCH and the device information of the terminal device.

In an embodiment of the present application, the configuration information of the PUSCH includes configuration information of a scrambling code of the PUSCH; the configuration information of the scrambling code of the PUSCH includes: the corresponding relationship between the first parameter and the device information of the terminal device, or the corresponding relationship between the second parameter and the device information of the terminal device; where the first parameter or the second parameter are both used to determine the first initialization value for generating the scrambling code of the PUSCH.

In an embodiment of the present application, the configuration information of the PUSCH includes configuration information of a resource of a DMRS of the PUSCH; the configuration information of the resource of the DMRS of the PUSCH includes a corresponding relationship between the resource of the DMRS of the PUSCH and the device information of the terminal device.

In an embodiment of the present application, the configuration information of the PUSCH includes configuration information of a sequence of the DMRS of the PUSCH; the configuration information of the sequence of the DMRS of the PUSCH includes: the corresponding relationship between the third parameter and the device information of the terminal device, or the corresponding relationship between the fourth parameter and the device information of the terminal device; where the third parameter or the fourth parameter are both used to determine the second initialization value for generating the sequence of the DMRS of the PUSCH.

In an embodiment of the present application, the configuration information of the PUSCH includes a corresponding relationship between, at least one of: the scrambling code of the PUSCH and the sequence of the DMRS of the PUSCH, and the device information of the terminal device.

In an embodiment of the present application, the configuration information of the PUSCH includes the configuration information of the resource of the PUSCH and the configuration information of the resource of the DMRS of the PUSCH.

The network device provided in the present embodiment of the present application is configured to implement the technical solution implemented by the network device in the aforementioned method embodiments shown in FIG. 4 or FIG. 6, and implementation principles and technical effects thereof are similar, which will not be repeated here.

It should be noted that it should be understood that the above division for various modules of the terminal device or the network device is only a logical function division, which may be fully or partially integrated into a physical entity or physically separated during an actual implementation. And these modules may all be implemented in a form of software being called through a processing component, or in a form of hardware; or some modules may be implemented in the form of software being called through a processing component, and some modules may be implemented in the form of hardware. For example, a processing module may be a separately set processing component, or may be integrated in a chip of the aforementioned apparatus for implementation. In addition, the processing module may also be stored in a memory of the aforementioned apparatus in a form of program code, which is called by a certain processing component of the aforementioned apparatus to execute the functions of the aforementioned determining module. Implementations of other modules are similar. In addition, all or part of these modules may be integrated together or implemented independently. The processing component described here may be an integrated circuit with a signal processing capability. In an implementation process, each step in the aforementioned method or each module may be completed by an integrated logic circuit of hardware in a processor component or an instruction in a form of software.

For example, these modules may be one or more integrated circuits configured to implement the above methods, for example, one or more application specific integrated circuits (ASIC), or, one or more microprocessors (digital signal processor, DSP), or, one or more field programmable gate arrays (FPGA), etc. For another example, when one of the above modules is implemented in a form of a processing component scheduling a program code, the processing component may be a general-purpose processor, for example, a central processing unit (CPU) or other processors that can call program codes. For another example, these modules may be integrated together and implemented in a form of a system-on-a-chip (SOC).

In the aforementioned embodiments, it may be realized wholly or partially by software, hardware, firm ware or any combination thereof. When implemented by software, it may be implemented in a form of a computer program product wholly or partially. The computer program product includes one or more computer instructions. When the computer program instructions are loaded and executed on a computer, the processes or functions described in the embodiments of the present application are generated wholly or partially. The computer may be a general computer, a dedicated computer, a computer network, or other programmable apparatuses. The computer instruction may be stored in a computer readable storage medium, or transmitted from one computer readable storage medium to another computer readable storage medium. For example, the computer instruction may be transmitted from a website site, computer, server or data center to another website site, computer, server or data center in a wired (for example, a coaxial cable, an optical fiber, a digital subscriber line (DSL)) or wireless (for example, infrared, wireless, microwave, etc.) manner. The computer readable storage medium may be any available medium that can be accessed by a computer, or a data storage device such as a server, a data center, etc., which is integrated with one or more available media. The available media may be magnetic media (for example, a floppy disk, a hard disk, a magnetic tape), optical media (for example, DVD), or semiconductor media (for example, a solid state disk (SSD)), etc.

Figure 11:
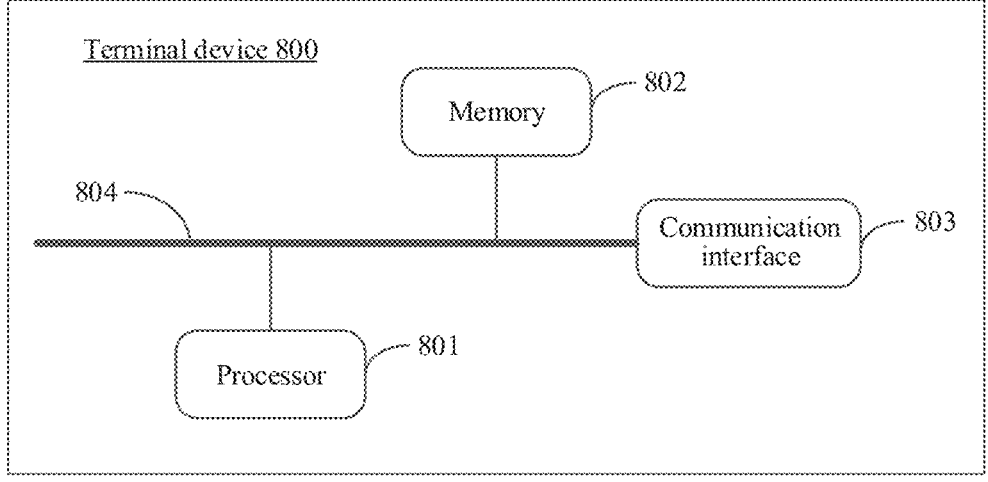
FIG. 11 is a schematic diagram of a hardware structure of a terminal device provided by an embodiment of the present application.

FIG. 11 is a schematic diagram of a hardware structure of a terminal device provided by an embodiment of the present application. As shown in FIG. 11, a terminal device 800 in the present embodiment may include: a processor 801, a memory 802 and a communication interface 803. The memory 802 is configured to store a computer program; and the processor 801 is configured to execute the computer program stored in the memory 802 to implement the method executed by the terminal device in any of the aforementioned method embodiments. The communication interface 803 is configured to perform data communication or signal communication with other devices.

In an implementation, the memory 802 may be either independent or integrated with the processor 801. When the memory 802 is a component independent of the processor 801, the terminal device 800 may further include a bus 804 configured to connect the memory 802 and the processor 801.

In a possible implementation mode, the processing module 601 in FIG. 7 or FIG. 8 may be integrated into the processor 801 for implementation, the sending module 602 in FIG. 7 or FIG. 8 may be integrated into the communication interface 803 for implementation, and the receiving module 603 in FIG. 8 may be integrated into the communication interface 803 for implementation. In a possible implementation mode, the processor 801 may be configured to implement the signal processing operations of the terminal device in the aforementioned method embodiments, and the communication interface 803 may be configured to implement the signal receiving and sending operations of the terminal device in the aforementioned method embodiments.

The terminal device provided in the present embodiment may be configured to execute the method executed by the terminal device in any of the aforementioned method embodiments, and implementation principles and technical effects thereof are similar, which will not be repeated here.

Figure 12:
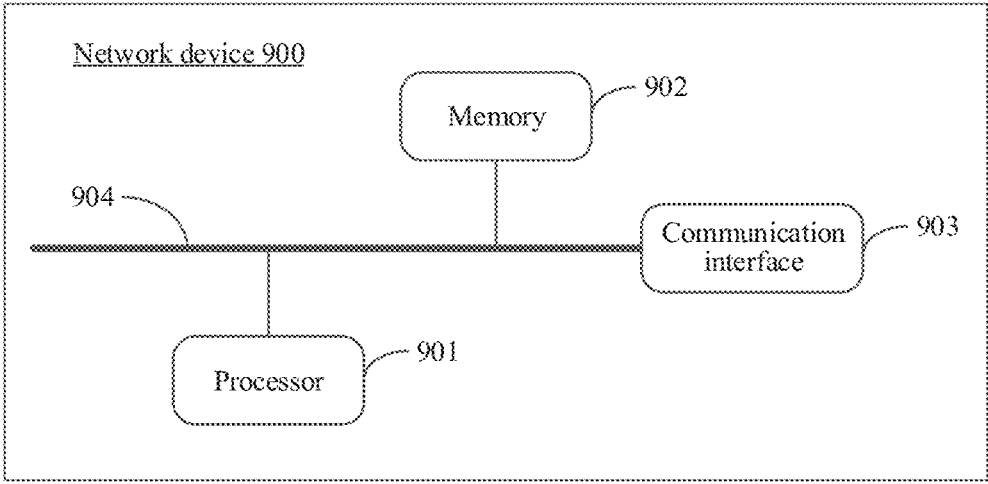
FIG. 12 is a schematic diagram of a hardware structure of a network device provided by an embodiment of the present application.

FIG. 12 is a schematic diagram of a hardware structure of a network device provided by an embodiment of the present application. As shown in FIG. 12, a network device 900 in the present embodiment may include: a processor 901, a memory 902 and a communication interface 903. The memory 902 is configured to store a computer program; and the processor 901 is configured to execute the computer program stored in the memory 902 to implement the method executed by the network device in any of the aforementioned method embodiments. The communication interface 903 is configured to perform data communication or signal communication with other devices.

In an implementation, the memory 902 may be either independent or integrated with the processor 901. When the memory 902 is a component independent of the processor 901, the network device 900 may further include a bus 904 configured to connect the memory 902 and the processor 901.

In a possible implementation mode, the processing module 702 in FIG. 9 or FIG. 10 may be integrated into the processor 901 for implementation, the receiving module 701 in FIG. 9 or FIG. 10 may be integrated into the communication interface 903 for implementation, and the sending module 703 in FIG. 10 may be integrated into the communication interface 903 for implementation. In a possible implementation mode, the processor 901 may be configured to implement the signal processing operations of the network device in the aforementioned method embodiments, and the communication interface 903 may be configured to implement the signal receiving and sending operations of the network device in the aforementioned method embodiments.

The network device provided in the present embodiment may be configured to execute the method executed by the network device in any of the aforementioned method embodiments, and implementation principles and technical effects thereof are similar, which will not be repeated here.

The embodiments of the present application further provide a storage medium in which a computer program is stored, and the computer program is used to implement the technical solution of the terminal device in any of the aforementioned method embodiments when executed by a processor.

The embodiments of the present application further provide a program, and the program is used to implement the technical solution of the terminal device in any of the aforementioned method embodiments when executed by a processor.

The embodiments of the present application further provide a computer program product, including a program instruction, and the program instruction is used to implement the technical solution of the terminal device in any of the aforementioned method embodiments.

The embodiments of the present application further provide a chip, including: a processing module and a communication interface, the processing module being able to implement the technical solution of the terminal device in the aforementioned method embodiments. Further, the chip further includes a storing module (for example, a memory), and the storing module is configured to store an instruction. The processing module is configured to execute the instruction stored in the storing module, and execution of the instruction stored in the storing module causes the processing module to execute the technical solution of the terminal device.

The embodiments of the present application further provide a storage medium in which a computer program is stored, and the computer program is used to implement the technical solution of the network device in any of the aforementioned method embodiments when executed by a processor.

The embodiments of the present application further provide a program, and the program is used to implement the technical solution of the network device in any of the aforementioned method embodiments when executed by a processor.

The embodiments of the present application further provide a computer program product, including a program instruction, and the program instruction is used to implement the technical solution of the network device in any of the aforementioned method embodiments.

The embodiments of the present application further provide a chip, including: a processing module and a communication interface, the processing module being able to implement the technical solution of the network device in the aforementioned method embodiments. Further, the chip further includes a storing module (for example, a memory), and the storing module is configured to store an instruction. The processing module is configured to execute the instruction stored in the storing module, and execution of the instruction stored in the storing module causes the processing module to execute the technical solution of the network device.

In the present application, "at least two" refers to two or more, and "a plurality of" refers to two or more. "And/or" describes an association relationship of associated objects and represents that there may be three kinds of relationships, for example, A and/or B, may represent: A exists alone, A and B exist at the same time, and B exists alone, where A and B may be singular or plural. A character "/" generally represents that associated objects before and after are in an "or" relationship; in a formula, a character "/" represents that associated objects before and after are in a "division" relationship. "At least one of the following" or similar expressions thereof refers to any combination of these items, including any combination of single items or plural items. For example, at least one of a, b, or c may represent: a, b, c, a-b, a-c, b-c, or a-b-c, where a, b, c may be single or multiple.

It can be understood that distinction of various numbers involved in the embodiments of the present application is only for convenience of description, and is not used to limit the scope of the embodiments of the present application.

It can be understood that, in the embodiments of the present application, a size of a serial number of the aforementioned processes does not mean execution order, and the execution order of each process should be determined by function and internal logic thereof, without any restriction on the implementation process of the embodiments of the present application.

What is claimed is:

1. An information transmission method, comprising:

generating, by a terminal device, indication information, the indication information being used to indicate a device type of the terminal device, wherein the device type of the terminal device comprises a RedCap terminal or a non-RedCap terminal; and sending, by the terminal device in a random access procedure, the indication information to a network device to provide an indication that the terminal device which is performing the random access procedure is a RedCap terminal or a non-RedCap terminal, the indication information being carried by a physical uplink shared channel (PUSCH), wherein the PUSCH is a PUSCH in a Msg3 or a PUSCH in a MsgA, the indication information is carried in a media access control protocol data unit (MAC PDU), wherein the indication information is carried in a MAC header of a MAC subPDU, wherein the MAC header of the MAC subPDU is configured for the network device to determine that the terminal device which is performing the random access procedure is a RedCap terminal or a non-RedCap terminal.

2. An information transmission method, comprising:

receiving, by a network device in a random access procedure from a terminal device, indication information providing an indication that the terminal device which is performing the random access procedure is a RedCap terminal or a non-RedCap terminal, the indication information being used to indicate a device type of the terminal device, and the indication information being carried through a physical uplink shared channel (PUSCH), wherein the device type of the terminal device comprises a RedCap terminal or a non-RedCap terminal, the PUSCH is a PUSCH in a Msg3 or a PUSCH in a MsgA, the indication information is carried in a media access control protocol data unit (MAC PDU), wherein the indication information is carried in a MAC header of a MAC subPDU, wherein the MAC header of the MAC subPDU is configured for the network device to determine that the terminal device which is performing the random access procedure is a RedCap terminal or a non-RedCap terminal; and determining, by the network device, the device type of the terminal device according to the indication information.

3. A terminal device, comprising:

at least one processor; and a memory communicatively connected with the at least one processor; wherein, the memory stores instructions executable by the at least one processor, and the instructions, when executed by the at least one processor, cause the at least one processor to:

generate indication information, the indication information being used to indicate a device type of the terminal device, wherein the device type of the terminal device comprises a RedCap terminal or a non-RedCap terminal; and send, in a random access procedure, the indication information to a network device to provide an indication that the terminal device which is performing the random access procedure is a RedCap terminal or a non-RedCap terminal, the indication information being carried by a physical uplink shared channel (PUSCH), wherein the PUSCH is a PUSCH in a Msg3 or a PUSCH in a MsgA, the indication information is carried in a media access control protocol data unit (MAC PDU), wherein the indication information is carried in a MAC header of a MAC subPDU, wherein the MAC header of the MAC subPDU is configured for the network device to determine that the terminal device which is performing the random access procedure is a RedCap terminal or a non-RedCap terminal.

4. A network device, comprising:

at least one processor; and a memory communicatively connected with the at least one processor; wherein, the memory stores instructions executable by the at least one processor, and the instructions, when executed by be at least one processor, cause the at least one processor to:

receive, in a random access procedure from a terminal device, indication information providing an indication that the terminal device which is performing the random access procedure is a RedCap terminal or a non-RedCap terminal, the indication information being used to indicate a device type of the terminal device and the indication information being carried through a physical uplink shared channel PUSCH, wherein the device type of the terminal device comprises a RedCap terminal or a non-RedCap terminal, the PUSCH is a PUSCH in a Msg3 or a PUSCH in a MsgA, the indication information is carried in a media access control protocol data unit (MAC PDU), wherein the indication information is carried in a MAC header of a MAC subPDU, wherein the MAC header of the MAC subPDU is configured for the network device to determine that the terminal device which is performing the random access procedure is a RedCap terminal or a non-RedCap terminal; and determine the device type of the terminal device according to the indication information.

* * * * *